US008494236B2

(12) United States Patent
Jolly et al.

(10) Patent No.: US 8,494,236 B2
(45) Date of Patent: Jul. 23, 2013

(54) SYSTEM AND METHOD FOR CARDIAC SEGMENTATION IN MR-CINE DATA USING INVERSE CONSISTENT NON-RIGID REGISTRATION

(75) Inventors: Marie-Pierre Jolly, Hillsborough, NJ (US); Christoph Guetter, Lawrenceville, NJ (US); Jens Guehring, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 310 days.

(21) Appl. No.: 12/894,255

(22) Filed: Nov. 30, 2010

(65) Prior Publication Data

US 2011/0081066 A1    Apr. 7, 2011

(51) Int. Cl.
G06K 9/00    (2006.01)
G06K 9/46    (2006.01)
G06K 9/34    (2006.01)

(52) U.S. Cl.
USPC ........... 382/128; 382/100; 382/181; 382/190; 382/173; 382/103

(58) Field of Classification Search
None
See application file for complete search history.

(56) References Cited

U.S. PATENT DOCUMENTS

2009/0097727 A1    4/2009    Jolly et al.
2009/0232371 A1    9/2009    Jolly

OTHER PUBLICATIONS

Jolly et al (Combining Registration and Minimum Surfaces for the Segmentation of the Left Ventricle in Cardiac Cine MR Images, MICCAI 2009).*
Christensen et al ("Consistent Image Registration", IEEE Jul. 2001).*
Gabor T. Herman, et al. ,"Multiseeded Segmentation Using Fuzzy Connections," IEEE Transactions on Pattern Analysis and Machine Intelligence, vol. 23, No. 5, May 2001, pp. 460-474.
Marie-Pierre Jolly, et al., "Combining Registration and Minimum Surfaces for the Segmentation of the Left Ventricle in Cardiac Cine MR Images," MICCAI 2009, Part II, LNCS 5762, pp. 910-918, 2009.
Gerardo Hermisillo, et al., "Variational Methods for Multimodal Image Matching," International Journal of Computer Vision, 50(3), pp. 329-343, 2002.
Jayaram K. Udupa, et al., "Fuzzy Connectedness and Object Definition: Theory, Algorithms, and Applications in Image Segmentation," Graphical Models and Image Processing vol. 58, No. 3, May, pp. 246-261, 1996, Article No. 0021.

* cited by examiner

*Primary Examiner* — Jason M Repko
*Assistant Examiner* — Avinash J Yentrapati
(74) *Attorney, Agent, or Firm* — Donald B. Paschburg; F. Chau & Associates, LLC

(57) ABSTRACT

A method for cardiac segmentation in magnetic resonance (MR) cine data, includes providing a time series of 3D cardiac MR images acquired at a plurality of phases over at least one cardiac cycle, in which each 3D image includes a plurality of 2D slices, and a heart and blood pool has been detected in each image. Gray scales of each image are analyzed to compute histograms of the blood pool and myocardium. Non-rigid registration deformation fields are calculated to register a selected image slice with corresponding slices in each phase. Endocardium and epicardium gradients are calculated for one phase of the selected image slice. Contours for the endocardium and epicardium are computed from the gradients in the one phase, and the endocardium and epicardium contours are recovered in all phases of the selected image slice. The recovered endocardium and epicardium contours segment the heart in the selected image slice.

21 Claims, 7 Drawing Sheets

|  | RMS (pixels) | | | RMS (mm) | | | Dice Coefficient | | |
|---|---|---|---|---|---|---|---|---|---|
|  | avg | min | max | avg | min | max | avg | min | max |
| overall | 2.10 | 0.94 | 3.36 | 3.05 | 1.44 | 4.60 | 0.88 | 0.74 | 0.97 |
| endocardium | 2.06 | 0.82 | 3.70 | 2.97 | 1.22 | 5.05 | 0.87 | 0.66 | 0.97 |
| epicardium | 2.12 | 0.90 | 3.80 | 3.11 | 1.40 | 5.19 | 0.91 | 0.85 | 0.97 |

FIG. 6

SYSTEM AND METHOD FOR CARDIAC SEGMENTATION IN MR-CINE DATA USING INVERSE CONSISTENT NON-RIGID REGISTRATION

CROSS REFERENCE TO RELATED UNITED STATES APPLICATIONS

This application claims priority from "Cardiac Segmentation in MR Cine Data Using Inverse Consistent Deformable Registration", U.S. Provisional Application No. 61/249,273 of Jolly, et al., filed Oct. 7, 2009, the contents of which are herein incorporated by reference in their entirety.

TECHNICAL FIELD

This disclosure is directed to the segmentation of the myocardium (endocardium and epicardium) in the left ventricle of the heart from cardiac cine magnetic resonance (MR) images.

DISCUSSION OF THE RELATED ART

Cardiovascular disease is an important health concern in the western world. Physicians use non invasive technologies such as magnetic resonance imaging (MRI) to observe the left ventricle (LV), which pumps oxygenated blood out to the rest of the body. They are interested in measuring quantities such as the ejection fraction, myocardial mass, blood volume over time, and myocardial thickening that can all be estimated given an outline of the LV myocardium. Manual outlining in all images is very cumbersome, however, and most physicians limit it to the end-diastolic (ED) and end-systolic (ES) phases, which is not enough to estimate most quantities. In addition, the right ventricle is also important to diagnose certain diseases, such as hypertrophy of the right ventricle, or tetralogy of fallot.

The segmentation of the myocardium is challenging for a number of reasons. First, there is no consistent correspondence between the gray levels in the images and the anatomy in the body, so every acquisition is different and unpredictable. Other difficulties in segmenting the myocardium include: (1) the presence of papillary muscles and trabeculations in the blood pool that contribute to partial voluming between blood and muscle; (2) often no clear edge between the myocardium and the liver; (3) if there is fat around the heart, the fat/lungs edge is stronger than the fat/myocardium edge; and (4) the trabeculations in the right ventricle might also generate partial voluming near the epicardium.

Cardiac magnetic resonance (MR) cine data images the heart in several 2-dimensional slices from base to apex over multiple cardiac phases describing the cardiac cycle. The physician deduces a diagnosis from multiple cardiac parameters, such as ejection fraction, cardiac output, blood volume over time, ventricular mass, and wall thickness. These measurements can be derived from the segmentation of the myocardium (endocardium and epicardium) of the left ventricle.

Cardiac magnetic resonance (MR) cine data consists of 3D+T data and can be thought of as a time series of 3D MR images acquired over at least one cardiac cycle, and thus may be considered to be a 3D+T dimensional image. Each 2D slice of a 3D image acquired at time t during the cardiac cycle may be represented as $I_z(x, y, t)$, where x, y identify a pixel position, and z is the $3^{rd}$ dimension parameter. Although some researchers have attempted 4D segmentation, it is, however, challenging to build a model that is general enough to cover all possible shapes and dynamics of the LV and a model-free approach would not be constrained enough. The approach of segmenting each image individually results in little cohesion between images and unsmooth contours over time. Intermediate approaches consist in segmenting either one phase at a time or one slice at a time. Segmentation of one phase at a time is usually done with a model-based 3D segmentation but faces three challenges. First, the model needs to be trained for all possible LV shapes and pathologies and all possible MR acquisition protocols. Second, MR slices are so far apart (8-10 mm) compared to the in-slice resolution (1-2 mm) that the 3D segmentation problem is very anisotropic. Finally, individual slices might have been acquired at different breath hold and be misregistered.

SUMMARY OF THE INVENTION

Exemplary embodiments of the invention as described herein generally include methods and systems for a registration-based segmentation to fully automatically segment the left ventricle in cardiac cine magnetic resonance studies. A method according to an embodiment of the invention segments one slice at a time using non-rigid registration, taking advantage of the strong temporal correlation between phases, and propagate the segmentation between slices. A method according to an embodiment of the invention uses an inverse consistent non-rigid registration algorithm to recover one set of forward and backward deformation fields that allows accessing the deformation from any frame to any other frame in the cardiac sequence. Cardiac phases are segmented using a shortest path algorithm and time consistency is enforced through the deformation fields. A segmentation algorithm according to an embodiment of the invention can be applied to any phase and the contours in the other phases can be recovered through the forward and backward deformation fields. The segmentation that results in the best set of contours is then retained. This can be done because the non-rigid registration is inverse consistent, as otherwise, one would have had to recover many deformation fields between all pairs of phases, which would be impractical. Tests conducted with a method according to an embodiment of the invention demonstrated that the segmentation is accurate and consistent in time on a large number of clinical datasets.

According to an aspect of the invention, there is provided a method for cardiac segmentation in magnetic resonance (MR) cine data, including providing a time series of 3D cardiac MR images acquired at a plurality of phases over at least one cardiac cycle, where each 3D image includes a plurality of 2D slices, where a heart and blood pool has been detected in each image, analyzing gray scales of each image in the time series of images to compute histograms of the blood pool, myocardium, and the whole series of images, calculating non-rigid registration deformation fields to register a selected image slice with corresponding slices in each phase of the time series of images, computing endocardium and epicardium gradients for one phase of the selected image slice, computing contours for the endocardium and epicardium from the gradients in the one phase of the selected image slice, and recovering the endocardium and epicardium contours in all phases of the selected image slice, where the recovered endocardium and epicardium contours segment the heart in the selected image slice.

According to a further aspect of the invention, the method includes using image pixels in peaks of the histograms to seed a multiseeded fuzzy connected algorithm to group image pixels into homogenous regions for the heart, blood pool, and background to form a label image, where the heart, blood pool, and background are labeled.

According to a further aspect of the invention, calculating non-rigid registration deformation fields to register a selected image slice with corresponding slices in each phase of the time series of images includes finding an inverse consistent deformation field $\Phi_{pq}:R^2 \mapsto R^2$ between two phases $f_p$ and $f_q$ of a given slice that minimizes an inverse consistent similarity metric $J_C^{ic}=J_{CC}(f_p,f_q,\Phi_{pq})+J_{CC}(f_q,f_p,\Phi_{qp})$.

According to a further aspect of the invention, the similarity metric is defined as $$J_{CC}(f_p, f_q, \Phi_{pq}) = \sum_x \frac{\sum_N (f_p(x) - \bar{f}_p)(f_q(\Phi_{pq}(x)) - \bar{f}_q)}{\sqrt{\sum_N (f_p(x) - \bar{f}_p)^2 \sum_N (f_q(\Phi_{pq}(x)) - \bar{f}_q)^2}},$$

where $\bar{f}_p$ and $\bar{f}_q$ the mean values in a neighborhood around pixel location x in both slice phases, and N is the number of elements in that neighborhood.

According to a further aspect of the invention, the similarity metric is minimized using variational calculus and solving a partial differential equation that descends a gradient of $J_{CC}$.

According to a further aspect of the invention, computing endocardium and epicardium gradients includes computing probability images $P_M$ and $P_B$ as responses from the myocardium and blood pool histograms, computing gradients of the probability images and of the selected image slice, analyzing the label image L to find upwards transitions from the myocardium to non-myocardium, and smoothing the transitions, and computing the gradients for the endocardium and epicardium according to $$G^{endo}(x) = \begin{cases} 0, & \text{if } \pi < \overrightarrow{\nabla P_M} < 2\pi \text{ or } 0 < \overrightarrow{\nabla P_M} < \pi \\ \frac{\nabla P_M(x) + 0.5 \nabla f(x) + \nabla L(x)}{2.5}, & \text{otherwise} \end{cases},$$

$$G^{epi}(x) = \begin{cases} 0, & \text{if } 0 < \overrightarrow{\nabla P_M} < \pi \\ \frac{0.5 \nabla P_M(x) + 0.5 \nabla P_B(x) + \nabla f(x)}{2}, & \text{otherwise} \end{cases},$$

where x is a pixel, $G^{endo}(x)$ is the endocardium gradient, $G^{epi}(x)$ is the epicardium contour, $\nabla P_M(x)$ is the myocardium gradient, $\nabla P_B(x)$ is the blood pool gradient, $\nabla f(x)$ is the image slice gradient, and $\nabla L(x)$ is the label image gradient.

According to a further aspect of the invention, computing contours for the endocardium and epicardium from the gradients includes using a shortest path algorithm with a contour energy function of the form $$E(C) = \sum_{x \in C} \frac{1}{G^2(x) + \varepsilon},$$

where G is either the endocardial or epicardial gradient, and $\varepsilon$ is a small positive value to prevent a division by 0.

According to a further aspect of the invention, recovering the endocardium and epicardium contours in all phases of the selected image slice includes propagating the endocardium and epicardium contours to all other phases of the selected image slice using the non-rigid registration deformation fields, finding the endocardium and epicardium contours in each of the other phases of the selected image slice, finding a best contour for the selected image slice by finding a phase having a contour with a lowest energy, where the energy K(p) of a contour in a given phase p is $$K(p) = \sum_q E(C_q(C_p)),$$

where $C_p$ is the contour in phase p, $C_q$ is the contour in phase q, and E is the energy of the contour in phase q, and propagating the best contour to the other phases using the non-rigid registration deformation fields.

According to a further aspect of the invention, the method includes propagating the best contour to other slices using the non-rigid registration deformation fields, and finding a best contour for each other slice by calculating $$E'(C_q) = \min\left\{E(C_p) + D^2(x), \frac{1}{\varepsilon}\right\},$$

where $E'(C_q)$ is the energy of the contour in a current slice, $E(C_p)$ is the energy of the contour propagated from a previous slice, $D^2(x)$ is a distance map of pixels x in the current slice with respect to the contour propagated from the previous slice, and the $$\frac{1}{\varepsilon}$$

term bounds the cost function.

According to a further aspect of the invention, finding a best contour for a first slice to be segmented includes minimizing $$\left\{E(x) + \frac{D(x)}{\varepsilon \max_x D(x)}, \frac{1}{\varepsilon}\right\},$$

where E(x) is the energy of a contour derived from the blood pool detection, D(x) is the distance map of the contour that shows at every pixel the distance to the nearest contour point, and the $$\frac{1}{\varepsilon}$$

bounds the energy function.

According to another aspect of the invention, there is provided a method for cardiac segmentation in magnetic resonance (MR) cine data, including providing a time series of 3D cardiac MR images acquired at a plurality of phases over at least one cardiac cycle, where each 3D image includes a plurality of 2D slices, where a heart and blood pool has been detected in each image, calculating inverse consistent non-rigid registration deformation fields $\Phi_{pq}:R^2 \mapsto R^2$ to register a selected image slice $f_p$ with corresponding slices $f_q$ in each phase q of the time series of images, computing contours for the endocardium and epicardium in the one phase of the selected image slice, recovering the endocardium and epicardium contours in all phases of the selected image slice, where the recovered endocardium and epicardium contours segment the heart in the selected image slice, propagating the endocardium and epicardium contours to other slices using the non-rigid registration deformation fields, and finding best endocardium and epicardium contours for each other slice using the contour propagated from a previous slice as a prior, where the best endocardium and epicardium contours segment the heart in the time series of images.

According to a further aspect of the invention, the method includes analyzing gray scales of each image in the time series of images to compute histograms of the blood pool, myocardium, and the whole series of images, and using image pixels in peaks of the histograms to seed a multiseeded fuzzy connected algorithm to group image pixels into homogenous regions for the heart, blood pool, and background to form a label image, where the heart, blood pool, and background are labeled.

According to a further aspect of the invention, computing contours for the endocardium and epicardium in the one phase of the selected image slice includes computing probability images $P_M$ and $P_B$ as responses from the myocardium and blood pool histograms, computing gradients of the probability images and of the selected image slice, analyzing the label image L to find upwards transitions from the myocardium to non-myocardium, and smoothing the transitions, computing the gradients for the endocardium and epicardium according to $$G^{endo}(x) = \begin{cases} 0, & \text{if } \pi < \overrightarrow{\nabla P_M} < 2\pi \text{ or } 0 < \overrightarrow{\nabla P_B} < \pi \\ \frac{\nabla P_M(x) + 0.5\nabla f(x) + \nabla L(x)}{2.5}, & \text{otherwise} \end{cases},$$

$$G^{epi}(x) = \begin{cases} 0, & \text{if } 0 < \overrightarrow{\nabla P_M} < \pi \\ \frac{0.5\nabla P_M(x) + 0.5\nabla P_B(x) + \nabla f(x)}{2}, & \text{otherwise} \end{cases},$$

where x is a pixel, $G^{endo}(x)$ is the endocardium gradient, $G^{epi}(x)$ is the epicardium contour, $\nabla P_M(x)$ is the myocardium gradient, $\nabla P_B(x)$ is the blood pool gradient, $\nabla f(x)$ is the image slice gradient, and $\nabla L(x)$ is the label image gradient, and using a shortest path algorithm with a contour energy function of the form $$E(C) = \sum_{x \in C} \frac{1}{G^2(x) + \varepsilon},$$

where G is either the endocardial or epicardial gradient, and $\varepsilon$ is a small positive value to prevent a division by 0.

According to a further aspect of the invention, the inverse consistent non-rigid registration deformation fields minimize an inverse consistent similarity metric $J_C^{ic} = J_{CC}(f_p, f_q, \Phi_{pq}) + J_{CC}(f_q, f_p, \Phi_{qp})$, where $$J_{CC}(f_p, f_q, \Phi_{pq}) = \sum_x \frac{\sum_N (f_p(x) - \overline{f}_p)(f_q(\Phi_{pq}(x)) - \overline{f}_q)}{\sqrt{\sum_N (f_p(x) - \overline{f}_p)^2 \sum_N (f_q(\Phi_{pq}(x)) - \overline{f}_q)^2}},$$

where $\overline{f}_p$ and $\overline{f}_q$ are the mean values in a neighborhood around pixel location x in both slice phases, and N is the number of elements in that neighborhood.

According to a further aspect of the invention, finding best endocardium and epicardium contours for each other slice further includes calculating $$E'(C_q) = \min\left\{E(C_p) + D^2(x), \frac{1}{\varepsilon}\right\},$$

where $E'(C_q)$ is the energy of the contour in a current slice, $E(C_p)$ is the energy of the contour propagated from a previous slice, $D^2(x)$ is a distance map of pixels x in the current slice with respect to the contour propagated from the previous slice, and the $$\frac{1}{\varepsilon}$$

term bounds the cost function.

According to another aspect of the invention, there is provided a program storage device readable by a computer, tangibly embodying a program of instructions executable by the computer to perform the method steps for cardiac segmentation in magnetic resonance (MR) cine data.

BRIEF DESCRIPTION OF THE DRAWINGS

FIG. 6 is a table of RMS distances and Dice coefficients between ground truth and segmented contours, according to an embodiment of the invention.

DETAILED DESCRIPTION OF EXEMPLARY EMBODIMENTS

Figure 1:
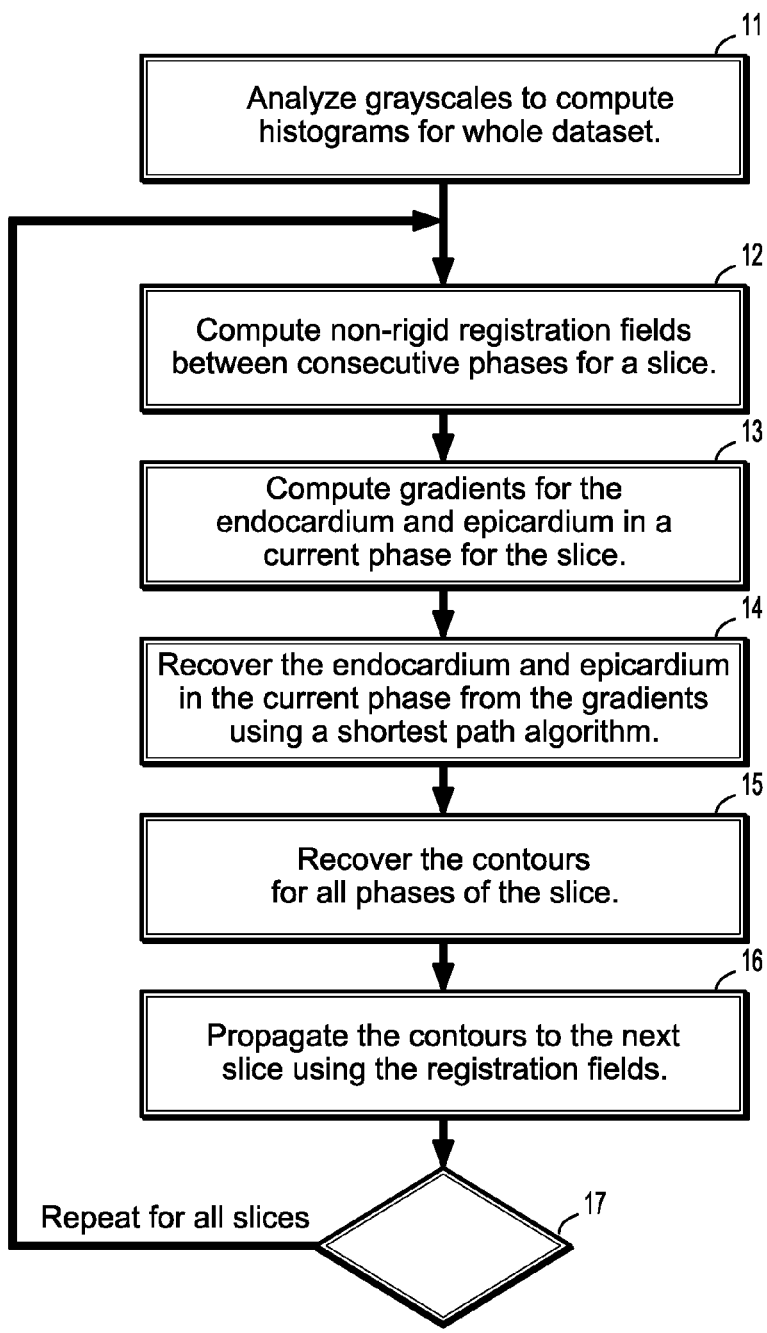
FIG. 1 is a flowchart of an algorithm for segmenting each slice, according to an embodiment of the invention.

Exemplary embodiments of the invention as described herein generally include systems and methods for segmenting the myocardium in the left ventricle of the heart from cardiac cine magnetic resonance (MR) images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

A method according to an embodiment of the invention assumes the heart and LV blood pool have already been detected in the images. Methods for detecting the heart and the LV blood pool have been described in "Automatic Recovery of the Left Ventricular Blood Pool in Cardiac Cine Magnetic Resonance Images", U.S. patent application Ser. No. 12/398,424 of Marie-Pierre Jolly, filed on Mar. 5, 2009, the contents of which are herein incorporated by reference in their entirety. Jolly's methods use the first harmonic of the Fourier transform in each slice to detect the beating heart. Then, blood-like connected components are extracted using Otsu thresholding and characterized by their shape, temporal behavior, position, etc. Finally, isoperimetric clustering is used to group connected components between slices and form the LV blood pool.

A flowchart of an algorithm according to an embodiment of the invention for segmenting each slice is presented in FIG. 1. An algorithm according to an embodiment of the invention may use a polar space mostly because the segmentation is performed using a shortest path algorithm that is known to be biased toward small contours in Cartesian space. However, it is not necessary to use a polar space, and algorithms according to other embodiments of the invention use a Cartesian space for all calculations. The center and maximum radius of the polar space are calculated from the blood pool estimates. Referring now to the flowchart, an algorithm includes the following steps: (1) analyzing gray scales to compute histograms over the entire dataset, at step 11; (2) non-rigid registration between consecutive phases for each slice, at step 12; (3) computing gradients for the endocardium and epicardium in a current phase for the current slice, at step 13; (4) applying Dijkstra's shortest path algorithm to recover the endocardium and epicardium from the gradients for the current phase of the current slice, at step 14; and (5) final contour recovery for all phases for the current slice, at step 15. Once the contours have been recovered for one slice, they can be propagated slice-by-slice, at step 16, to other slices using the non-rigid registration. Steps 12 through 16 are repeated for each slice from step 17. Each of these steps will be described in more detail in the following sections.

The first slice to be segmented is typically not the first slice in the dataset, which is the most basal slice, because that slice often intersects with the valve plane and is challenging to segment. Instead, an algorithm according to an embodiment of the invention picks a slice that shows as round an approximate blood pool as possible so that there are no interfering papillary muscles.

Gray Level Analysis

Because no two MR acquisitions are the same, it is important to determine the gray level properties of the images in the current dataset. In a first step, the entire dataset is used to compute approximate histograms for the blood pool, the myocardium and the background using regions that are automatically determined to be around the approximate blood pool. The pixels in the center of the main peaks in those histograms are used to seed a multiseeded fuzzy connectedness (MFC) algorithm, which groups pixels into homogeneous regions. The output of a MFC algorithm according to an embodiment of the invention is a label image L in which each homogeneous region is uniquely labeled. A fourth region may also be defined for partial voluming that is seeded with pixels whose gray levels fall between the blood and myocardium peaks.

The MFC algorithm, originally disclosed in G. T. Herman and B. M. Carvalho, "Multiseeded segmentation using fuzzy connectedness", IEEE Trans. Pattern Analysis and Machine Intelligence, Vol. 23, No. 5, pgs 460-474 (2001), the contents of which are herein incorporated by reference in their entirety, builds a shortest path from the seeds to all the pixels in the image, with regions competing as the paths are being built. A cost function is defined as the range of gray level intensities along the path to favor paths that do not vary significantly in gray level and, therefore, stay within one homogeneous region. The final histograms are then computed from the output label image.

The histograms are updated for each slice based on the segmentation that was obtained in the previous slice. New seeds are generated and the MFC algorithm is applied to the current slice to update the histograms and the labels. If, during this process, it is observed that the blood class splits into two modes and the highest mode gets close to the myocardium mode, a new class for partial voluming is introduced. However, if the blood mode moves to the left of the partial voluming mode, then the partial voluming class is eliminated.

Figure 2:
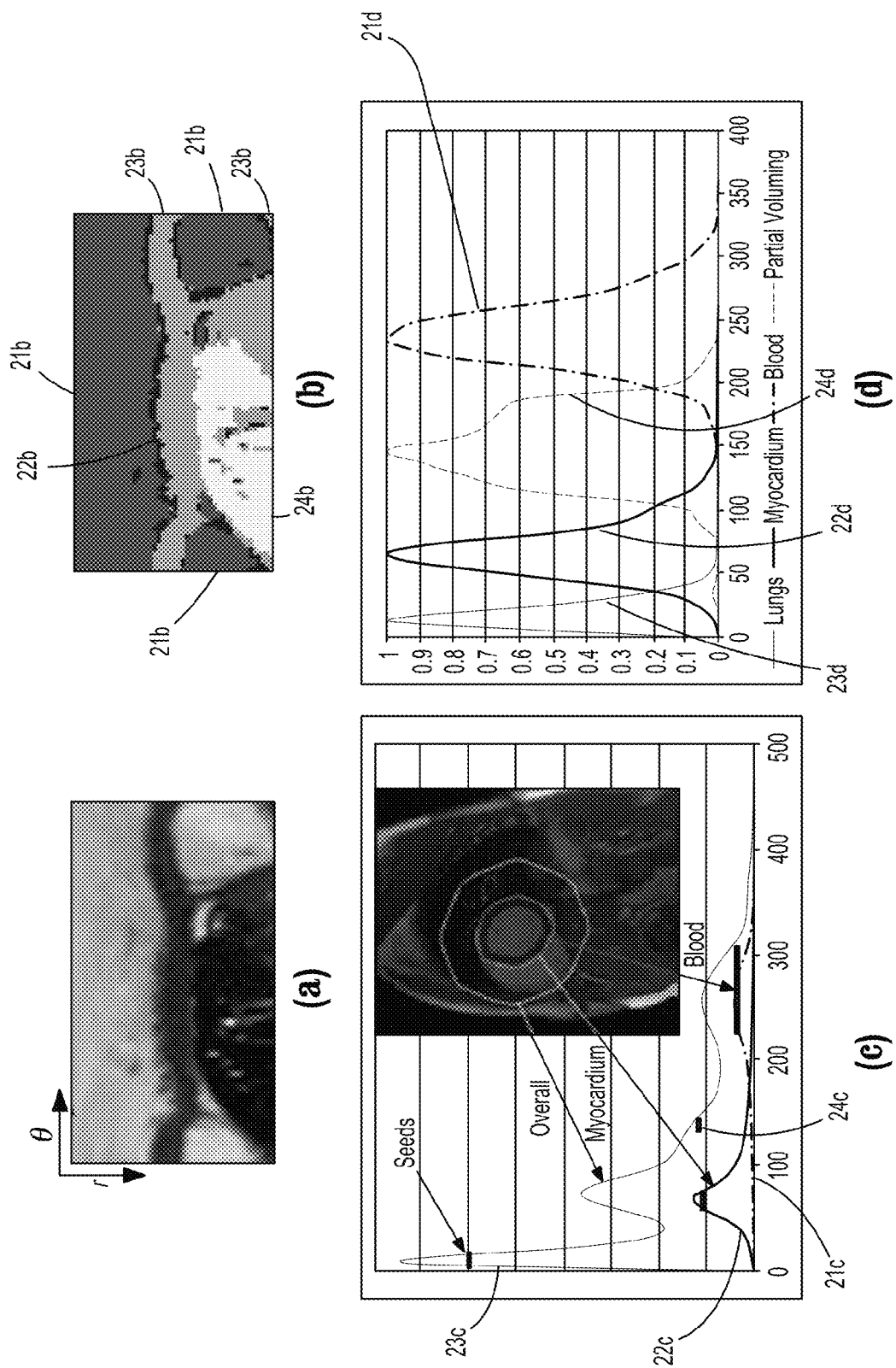
FIGS. 2(a)-(d) illustrate a gray level analysis according to an embodiment of the invention.

FIGS. 2(a)-(d) illustrate a gray level analysis according to an embodiment of the invention. FIG. 2(a) illustrates polar coordinates on an image; FIG. 2(b) illustrates a multiseeded fuzzy connectedness region labeling, with regions 21b, 22b, 23b and 24b; FIG. 2(c) depicts the original histograms for the blood pool 21c, myocardium 22c, and background 23c, and their correspondence to regions of the image, along with the gray level 24c selected for the partial voluming region; and FIG. 2(d) depicts the final histograms for the blood pool 21d, myocardium 22d, lungs 23d, and partial voluming 24d.

Non-Rigid Registration

A non-rigid registration algorithm according to an embodiment of the invention computes a dense deformation field $\Phi_{pq}:R^2 \mapsto R^2$ between two phases $f_p$ and $f_q$ of a given slice by minimizing a similarity metric:

$$\hat{\Phi}_{pq} = \arg(\Phi_{pq}) \min J(f_p, f_q, \Phi_{pq}). \qquad (1)$$

Note that the phases p and q need not be consecutive.

According to an embodiment of the invention, a local cross-correlation (CC) has been found to be a robust measure for registering MR cine data. Local CC is defined as:

$$J_{CC}(f_p, f_q, \Phi_{pq}) = \sum_x \frac{\sum_N (f_p(x) - \bar{f}_p)(f_q(\Phi_{pq}(x)) - \bar{f}_q)}{\sqrt{\sum_N (f_p(x) - \bar{f}_p)^2 \sum_N (f_q(\Phi_{pq}(x)) - \bar{f}_q)^2}}, \qquad (2)$$

where $\bar{f}_p$ and $\bar{f}_q$ the mean values in the neighborhood around pixel location x in both images, and N is the number of elements in that neighborhood. An exemplary, non-limiting scheme for computing the deformation field $\Phi_{pq}$ uses variational calculus and solves a partial differential equation that descends the gradient of $J_{CC}$, as disclosed in G. Hermosillo, C. Chefd'hotel, and O. Faugeras, "Variational methods for multimodal image matching", *International Journal of Computer Vision*, Vol. 50, No. 3 (2002), the contents of which are herein incorporated by reference in their entirety.

Registration of time series data such as MR cine is usually performed by selecting a keyphase as the reference to which all other phases are registered. However, this approach is unfeasible when contours need to be propagated from any arbitrary phase to any other phase. According to an embodiment of the invention, this issue is overcome by extending the non-rigid registration algorithm to become inverse consistent.

A deformation field $\Phi_{pq}$ is inverse consistent if $\Phi_{pq} \circ \Phi_{pq}^{-1}$=id and $\Phi_{pq}^{-1}=\Phi_{qp}$. The deformation field $\Phi_{pq}$ is retrieved by minimizing an inverse consistent similarity metric:

$$J_C^{ic} = J_{CC}(f_p, f_q, \Phi_{pq}) + J_{CC}(f_p, f_q, \Phi_{qp}). \quad (3)$$

According to an embodiment of the invention, an efficient update scheme of the iterative gradient descent is used to solve EQ. (3) in reasonable time. In essence, each deformation field is alternately updated during descending the gradient of $J_C^{ic}$ as follows:

$$\Phi_{12,0} = \Phi_{12,0}^{-1} = \Phi_{21,0} = \Phi_{21,0}^{-1} = id,$$
$$\Phi_{12,1} = \Phi_{12,0} \circ (id + \tau \cdot \nabla J_{12} * G_\sigma),$$
$$\Phi_{21,1} = \Phi_{12,1}^{-1},$$
$$\Phi_{21,2} = \Phi_{21,1} \circ (id + \tau \cdot \nabla J_{21} * G_\sigma)$$
$$\Phi_{12,2} = \Phi_{21,2}^{-1}$$
$$\Phi_{12,3} = \Phi_{12,2} \circ (id + \tau \cdot \nabla J_{12} * G_\sigma)$$
$$\vdots$$

using an iterative inverse transformation correction step at each registration iteration $$\phi_{i+1}^{-1} = \theta(-\phi_i(id \circ \phi_i^{-1}(x))) + (1-\theta)\phi_i^{-1}(x),$$

i=0, ..., N,
$\theta \in [0,1]$,
where $J_{ij}=J(I_i, I_j, \Phi_{ij})=J_{ji}$ is a symmetric similarity metric, N describes how many correction steps should be taken and $\theta$ is a scalar that determines how aggressive the solution should be approached. The result is an accurate computation of the inverse deformation and a quasi-symmetric registration algorithm in which the final similarity metric satisfies $J_{12} \approx J_{21} \approx J$. The extra computational effort for calculating an inverse consistent non-rigid registration is only about 10%-15% when compared to prior methods.

The achieved inverse consistency not only allows for propagating contours between any two phases, but also for more accurate quasi-symmetric image registration.

Gradient Computation and Minimum Cost Path

Figure 3:
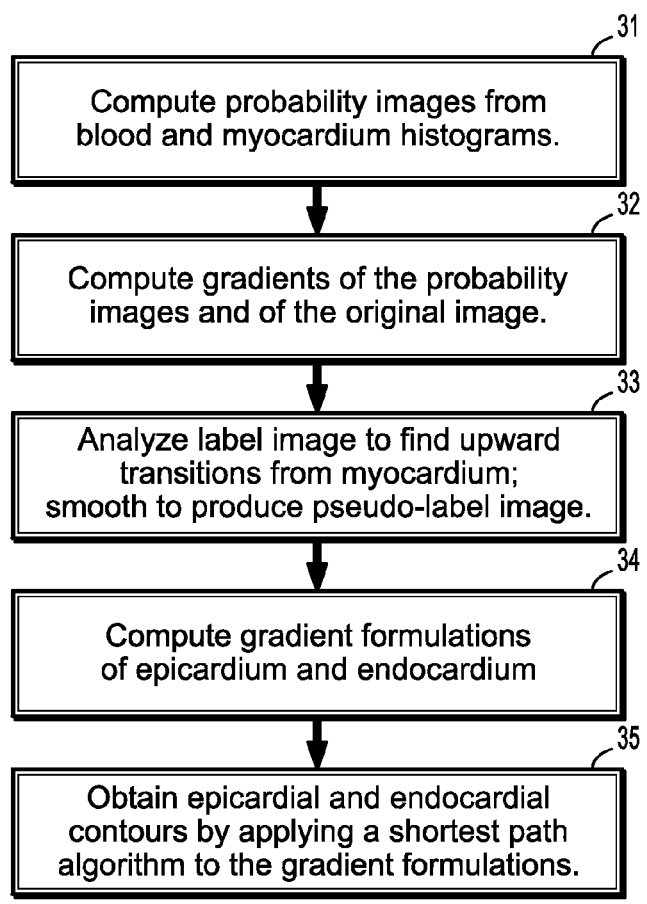
FIG. 3 is a flowchart of how gradients are computed for an image slice, according to an embodiment of the invention.

According to an embodiment of the invention, gradients are computed for an image slice as follows, with reference to the flowchart in FIG. 3. First, at step 31, probability images $P_M$ and $P_B$ are computed as responses from the myocardium and blood histograms. The gradient magnitude and direction, of these probability images as well as of the original image f, are computed using an edge detection filter at step 32. An exemplary, non-limiting edge detection filter is a Deriche filter. In addition, the label image L is examined for the upwards transitions from the myocardium label to the non-myocardium label, at step 33. These transitions are then smoothed to produce a pseudogradient image $\nabla L$. Next. At step 34, according to an embodiment of the invention, the gradients for the endocardium and epicardium were computed according to the following formulations:

$$G^{endo}(x) = \qquad (4)$$
$$\begin{cases} 0, & \text{if } \pi < \overrightarrow{\nabla P_M} < 2\pi \text{ or } 0 < \overrightarrow{\nabla P_B} < \pi \\ \frac{\nabla P_M(x) + 0.5 \nabla f(x) + \nabla L(x)}{2.5}, & \text{otherwise} \end{cases}$$

$$G^{epi}(x) = \begin{cases} 0, & \text{if } 0 < \overrightarrow{\nabla P_M} < \pi \\ \frac{0.5 \nabla P_M(x) + 0.5 \nabla P_B(x) + \nabla f(x)}{2}, & \text{otherwise} \end{cases} \qquad (5)$$

These formulations for the endocardium and epicardium were found to highlight the important features in the images. Finally, at step 35, according to an embodiment of the invention, a shortest path algorithm is used to compute the minimum path in the polar image from these gradients. An exemplary, non-limiting shortest path algorithm is Dijkstra's algorithm. In polar space, the image row axis is the radius and the column axis is the angle. The contour to be recovered goes from the left of the image to the right of the image. It separates the top of the image which corresponds to the blood pool from the bottom of the image which corresponds to the background. So, when searching for the minimum path in polar space, to generate the best segmentation contour, the left column in the image is used for the starting pixels for the path and the right column in the image is used for the ending pixels for the path. To guarantee that the path is closed, according to an embodiment of the invention, a branch and bound algorithm may be used. An exemplary, non-limiting branch and bound algorithm is that proposed by B. Appleton and C. Sun, "Circular shortest paths by branch and bound", *Pattern Recognition*, Vol. 36, No. 11, pgs. 2513-2520 (2003), the contents of which are herein incorporated by reference in their entirety. The energy function for a contour C used by Dijkstra's algorithm is defined as $$E(C) = \sum_{x \in C} \frac{1}{G^2(x) + \varepsilon},$$

where G is either the endocardial or epicardial gradient, and the $\epsilon$ term is a small positive value that prevents a division by 0. An exemplary, non-limiting value is $\epsilon$=0.05.

Contour Recovery in One Slice

Figure 4:
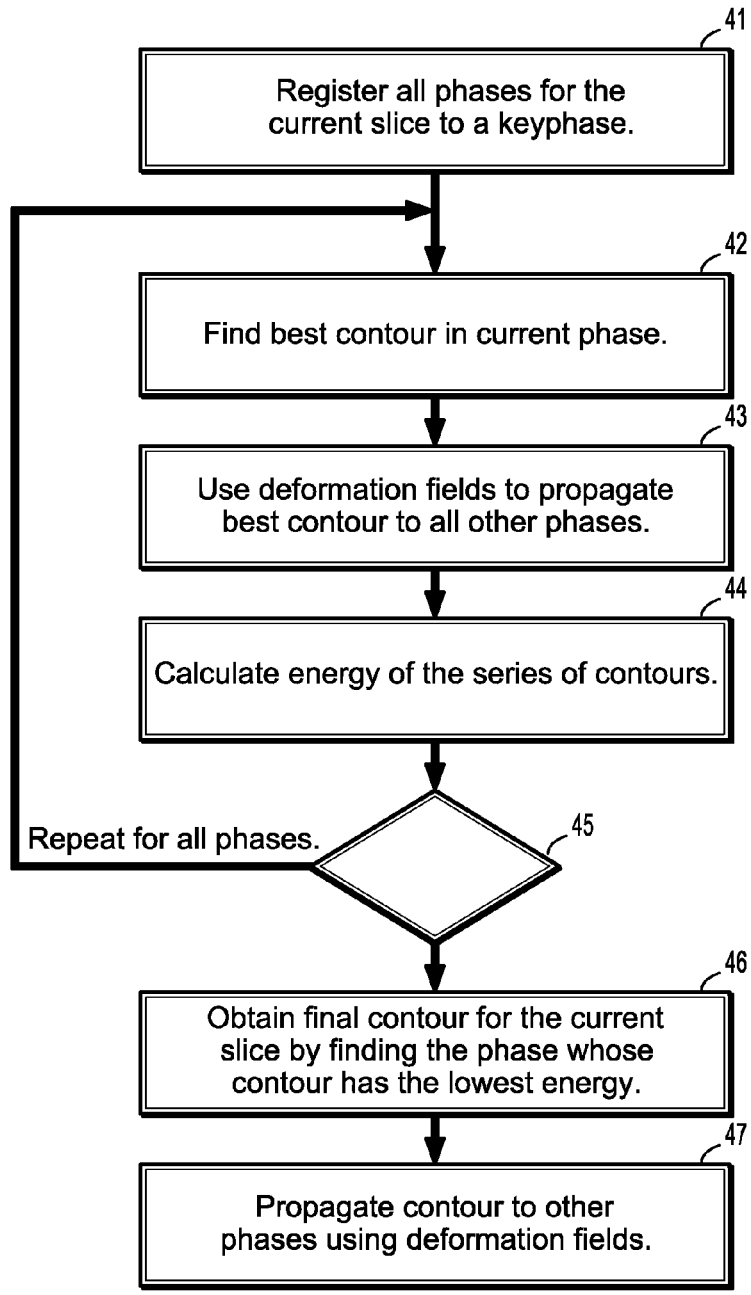
FIG. 4 is a flowchart of a method for recovering the contours for one slice, according to an embodiment of the invention.

According to an embodiment of the invention, the contours for one slice are recovered as follows, with reference to FIG. 4. First, at step 41, the deformation fields $\Phi_{kp}$ and $\Phi_{kp}^{-1}=\Phi_{pk}$ are recovered by registering all phases p to a keyphase k, as described above. An exemplary, non-limiting keyphase is the first phase (k=1), however, since a symmetric registration has been used, any phase can be selected as the keyphase. Next, at step 42, for each given phase p, Dijkstra's algorithm may be applied to recover the best contour $C_p$ for that phase, as previously described. The contours $C_q$ on the other phases q are generated at step 43 using the deformation fields (that have been converted to polar space) by $C_q(C_p)=\Phi_{kq}(\Phi_{kp}^{-1}$ ($C_p$)). This can only be done because the non-rigid registration is inverse consistent. The energy of this series of contours is given by $$K(p) = \sum_q E(C_q(C_p)),$$

which is calculated at step 44. Steps 42, 43, and 44 are repeated from step 45 for all phases p=1, ..., P. Finally, at step 46, the final segmentation in polar space is obtained by finding the phase whose contour has the lowest energy: K=$\min_p$ K(p).

Once the best sequence has been recovered, the best polar contour in the best phase is converted to Cartesian space and propagated to the other phases using the forward and backward deformation fields in Cartesian space at step 46. In addition, the convex hull of the endocardium is generated to further enforce that it goes behind the papillary muscles.
Propagation to Other Slices and Prior Information To propagate to the other slices, the non-rigid registration may be applied up toward the base and down toward the apex one slice at a time. The deformed contours from the previous slice are then used as priors for the new slice. The gradient-based energy function is combined with a distance function D(x) from the prior contours:

$$E'(x) = \min\left\{E(x) + D^2(x), \frac{1}{\varepsilon}\right\}, \quad (6)$$

where E is the energy as defined before and E' is the new energy, the distance map of a contour is an image that shows at every pixel the distance to the nearest contour point, and the $$\frac{1}{\varepsilon}$$

term bounds the cost function. For the first slice to be segmented, the priors may come from the approximate segmentation after the LV blood pool detection. However, since these contours are very imprecise, the influence of the distance in the energy function is weakened:

$$E'(x) = \min\left\{E(x) + \frac{D(x)}{\varepsilon \max_x D(x)}, \frac{1}{\varepsilon}\right\}, \quad (7)$$

According to an embodiment of the invention, a 2-step process may be used for the epicardium in the first slice. First, a rough estimate of the thickness of the myocardium is determined by finding the shortest path in every phase and averaging the distance between the epicardium and the endocardium. Then, the distance map to the expected thickness is combined with the gradient-based energy function as in EQ. (6). All the steps in this section are applied to each slice, one slice at a time using the energy function in EQ. (6) or EQ. (7)
Experimental Results A method according to an embodiment of the invention was applied to 52 datasets with expert outlined ground truth. The first 22 datasets were acquired from 4 different clinical sites. The other 30 datasets were acquired as part of the MICCAI 2009 Workshop on 3D Segmentation in the Clinic: A Grand Challenge. A fully automatic algorithm according to an embodiment of the invention generated the segmentation contours. An algorithm according to an embodiment of the invention is fast: it takes about 1 minute to segment an average dataset with 200 images having approximately 256×256 pixels on a dual core laptop with a 2.93 GHz processor and 4 GB RAM, or about 0.3 seconds per image.

Figure 5:
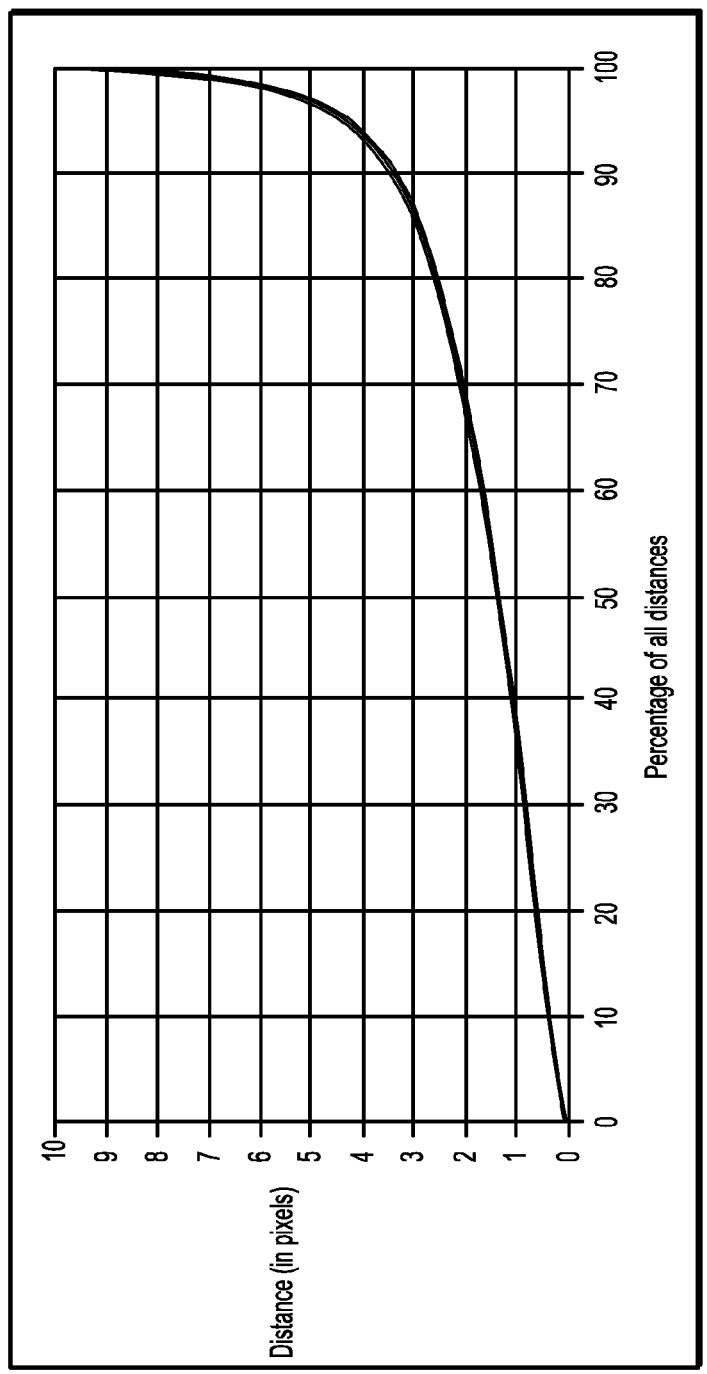
FIG. 5 depicts the cumulative histogram of distances between ground truth and segmented contours, according to an embodiment of the invention.

Distances between ground truth and segmented contours were computed by first subsampling the contours so that their vertices are one pixel apart. Then, for each vertex on each contour, the distance to the closest point, not necessarily a vertex, on the other contour was estimated. These distances can then be histogrammed for all contours, all images, and all datasets. FIG. 5 shows the cumulative histograms for all images between ground truth and the segmented contours for the endocardium and the epicardium, where a point (x, y) on the curve indicates that x % of all distances are below y pixels. Note that the histograms plots are essentially indistinguishable. The median distance is then 1.39 pixels, with 2.10 pixels RMS error and 0.88 Dice coefficient. FIG. 6 shows a table of the average, minimum, and maximum for the RMS distances (smaller is better) and Dice coefficients (larger is better) between ground truth and segmented contours for all datasets. Pixel sizes for the first 22 datasets vary between 1.32 and 2.47 mm and are 1.25 mm for the second batch of 30 datasets. It can be seen from both FIGS. 5 and 6 that the results for endocardium and epicardium are very similar and very good.

A method according to an embodiment of the invention uses the deformation fields explicitly, which improves the tracking of the epicardium contour. Another way to look at the consistency of the segmentation is to compute the LV mass, which is expected to be constant over time. The standard deviation of the mass was computed over time and averaged over the 52 datasets. It was small (4.75 g) compared to the average mass of the 52 test left ventricles (166.5 g).
System Implementations It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
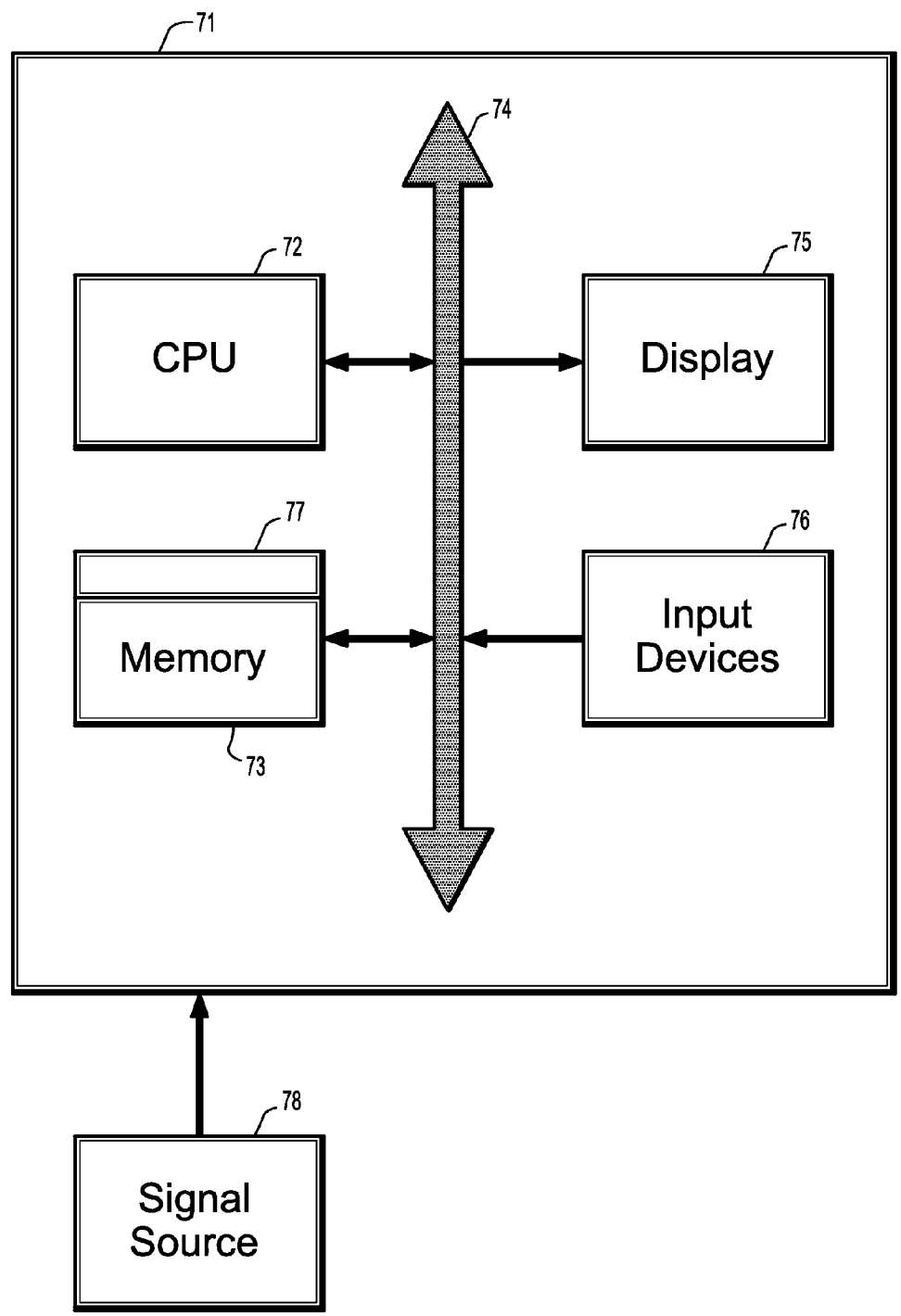
FIG. 7 is a block diagram of an exemplary computer system for implementing a method for segmenting the myocardium in the left ventricle of the heart from cardiac cine magnetic resonance (MR) images, according to an embodiment of the invention.

FIG. 7 is a block diagram of an exemplary computer system for implementing a method for segmenting the myocardium in the left ventricle of the heart from cardiac cine magnetic resonance (MR) images according to an embodiment of the invention. Referring now to FIG. 7, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method for cardiac segmentation in magnetic resonance (MR) cine data, the method comprising the steps of:
   providing a time series of 3D cardiac MR images acquired at a plurality of phases over at least one cardiac cycle, wherein each 3D image comprises a plurality of 2D slices, wherein a heart and blood pool has been detected in each image;
   analyzing gray scales of each image in the time series of images to compute histograms of the blood pool, myocardium, and the whole series of images;
   using image pixels in peaks of said histograms to seed a multiseeded fuzzy connected algorithm to group image pixels into homogenous regions for the heart, blood pool, and background to form a label image, wherein said heart, blood pool, and background are labeled;
   calculating non-rigid registration deformation fields to register a selected image slice with corresponding slices in each phase of the time series of images;
   computing endocardium and epicardium gradients for one phase of the selected image slice, including
      computing probability images $P_M$ and $P_B$ as responses from the myocardium and blood pool histograms;
      computing gradients of said probability images and of the selected image slice;
      analyzing said label image L to find upwards transitions from the myocardium to non-myocardium, and smoothing said transitions; and
      computing the gradients for the endocardium and epicardium according to $$G^{endo}(x) = \begin{cases} 0, & \text{if } \pi < \overrightarrow{\nabla P_M} < 2\pi \text{ or } 0 < \overrightarrow{\nabla P_B} < \pi \\ \frac{\nabla P_M(x) + 0.5\nabla f(x) + \nabla L(x)}{2.5}, & \text{otherwise} \end{cases},$$

$$G^{epi}(x) = \begin{cases} 0, & \text{if } 0 < \overrightarrow{\nabla P_M} < \pi \\ \frac{0.5\nabla P_M(x) + 0.5\nabla P_B(x) + \nabla f(x)}{2}, & \text{otherwise} \end{cases},$$

wherein x is a pixel, $G^{endo}(x)$ is the endocardium gradient, $G^{epi}(x)$ is the epicardium contour, $\nabla P_M(x)$ is the myocardium gradient, $\nabla P_B(x)$ is the blood pool gradient, $\nabla f(x)$ is the image slice gradient, and $\nabla L(x)$ is the label image gradient;

computing contours for the endocardium and epicardium from said gradients in said one phase of said selected image slice; and
   recovering the endocardium and epicardium contours in all phases of the selected image slice, wherein said recovered endocardium and epicardium contours segment the heart in said selected image slice.

2. The method of claim 1, wherein calculating non-rigid registration deformation fields to register a selected image slice with corresponding slices in each phase of the time series of images comprises finding an inverse consistent deformation field $\Phi_{pq}: R^2 \mapsto R^2$ between two phases $f_p$ and $f_q$ of a given slice that minimizes an inverse consistent similarity metric $J_C^{ic} = J_{CC}(f_p, f_q, \Phi_{pq}) + J_{CC}(f_q, f_p, \Phi_{qp})$.

3. The method of claim 2, wherein said similarity metric is defined as $$J_{CC}(f_p, f_q, \Phi_{pq}) = \sum_x \frac{\sum_N (f_p(x) - \overline{f}_p)(f_q(\Phi_{pq}(x)) - \overline{f}_q)}{\sqrt{\sum_N (f_p(x) - \overline{f}_p)^2 \sum_N (f_q(\Phi_{pq}(x)) - \overline{f}_q)^2}},$$

wherein $\overline{f}_p$ and $\overline{f}_q$ are the mean values in a neighborhood around pixel location x in both slice phases, and N is the number of elements in that neighborhood.

4. The method of claim 2, wherein the similarity metric is minimized using variational calculus and solving a partial differential equation that descends a gradient of $J_{CC}$.

5. The method of claim 1, wherein computing contours for the endocardium and epicardium from said gradients comprises using a shortest path algorithm with a contour energy function of the form $$E(C) = \sum_{x \in C} \frac{1}{G^2(x) + \varepsilon},$$

where G is either the endocardial or epicardial gradient, and $\varepsilon$ is a small positive value to prevent a division by 0.

6. The method of claim 1, wherein recovering the endocardium and epicardium contours in all phases of the selected image slice comprises:
   propagating the endocardium and epicardium contours to all other phases of the selected image slice using the non-rigid registration deformation fields;
   finding the endocardium and epicardium contours in each of the other phases of the selected image slice;
   finding a best contour for the selected image slice by finding a phase having a contour with a lowest energy, wherein the energy K(p) of a contour in a given phase p is $$K(p) = \sum_q E(C_q(C_p)),$$

wherein $C_p$ is the contour in phase p, $C_q$ is the contour in phase q, and E is the energy of the contour in phase q; and
   propagating said best contour to the other phases using the non-rigid registration deformation fields.

7. The method of claim 6, further comprising:
propagating said best contour to other slices using the non-rigid registration deformation fields; and
finding a best contour for each other slice by calculating $$E'(C_q) = \min\left\{E(C_p) + D^2(x), \frac{1}{\varepsilon}\right\},$$

wherein $E'(C_q)$ is the energy of the contour in a current slice, $E(C_p)$ is the energy of the contour propagated from a previous slice, $D^2(x)$ is a distance map of pixels x in said current slice with respect to the contour propagated from said previous slice, and the $$\frac{1}{\varepsilon}$$

term bounds the cost function.

8. The method of claim 7, wherein for a first slice to be segmented, finding a best contour comprises minimizing $$\left\{E(x) + \frac{D(x)}{\varepsilon \max_x D(x)}, \frac{1}{\varepsilon}\right\},$$

wherein $E(x)$ is the energy of a contour derived from the blood pool detection, $D(x)$ is the distance map of the contour that shows at every pixel the distance to the nearest contour point, and the $$\frac{1}{\varepsilon}$$

bounds the energy function.

9. A method for cardiac segmentation in magnetic resonance (MR) cine data, the method comprising the steps of:
providing a time series of 3D cardiac MR images acquired at a plurality of phases over at least one cardiac cycle, wherein each 3D image comprises a plurality of 2D slices, wherein a heart and blood pool has been detected in each image;
calculating inverse consistent non-rigid registration deformation fields $\Phi_{pq}: R^2 \mapsto R^2$ to register a selected image slice $f_p$ with corresponding slices $f_q$ in each phase q of the time series of images, wherein said inverse consistent non-rigid registration deformation fields minimize an inverse consistent similarity metric $J_C^{ic} = J_{CC}(f_p, f_q, \Phi_{pq}) + J_{CC}(f_q, f_p, \Phi_{qp})$, wherein $$J_{CC}(f_p, f_q, \Phi_{pq}) = \sum_x \frac{\sum_N (f_p(x) - \bar{f}_p)(f_q(\Phi_{pq}(x)) - \bar{f}_q)}{\sqrt{\sum_N (f_p(x) - \bar{f}_p)^2 \sum_N (f_q(\Phi_{pq}(x)) - \bar{f}_q)^2}},$$

wherein $\bar{f}_p$ and $\bar{f}_q$ are the mean values in a neighborhood around pixel location x in both slice phases, and N is the number of elements in that neighborhood;
computing contours for the endocardium and epicardium in said one phase of said selected image slice;
recovering the endocardium and epicardium contours in all phases of the selected image slice, wherein said recovered endocardium and epicardium contours segment the heart in said selected image slice;
propagating said endocardium and epicardium contours to other slices using the non-rigid registration deformation fields; and
finding the best endocardium and epicardium contours for each other slice using the contour propagated from a previous slice as a prior, wherein said best endocardium and epicardium contours segment the heart in said time series of images.

10. The method of claim 9, further comprising analyzing gray scales of each image in the time series of images to compute histograms of the blood pool, myocardium, and the whole series of images; and
using image pixels in peaks of said histograms to seed a multiseeded fuzzy connected algorithm to group image pixels into homogenous regions for the heart, blood pool, and background to form a label image, wherein said heart, blood pool, and background are labeled.

11. The method of claim 10, wherein computing contours for the endocardium and epicardium in said one phase of said selected image slice comprises:
computing probability images $P_M$ and $P_B$ as responses from the myocardium and blood pool histograms;
computing gradients of said probability images and of the selected image slice;
analyzing said label image L to find upwards transitions from the myocardium to non-myocardium, and smoothing said transitions;
computing the gradients for the endocardium and epicardium according to $$G^{endo}(x) = \begin{cases} 0, & \text{if } \pi < \overrightarrow{\nabla P_M} < 2\pi \text{ or } 0 < \overrightarrow{\nabla P_B} < \pi \\ \frac{\nabla P_M(x) + 0.5\nabla f(x) + \nabla L(x)}{2.5}, & \text{otherwise} \end{cases},$$

$$G^{epi}(x) = \begin{cases} 0, & \text{if } 0 < \overrightarrow{\nabla P_M} < \pi \\ \frac{0.5\nabla P_M(x) + 0.5\nabla P_B(x) + \nabla f(x)}{2}, & \text{otherwise} \end{cases},$$

wherein x is a pixel, $G^{endo}(x)$ is the endocardium gradient, $G^{epi}(x)$ is the epicardium contour, $\nabla P_M(x)$ is the myocardium gradient, $\nabla P_B(x)$ is the blood pool gradient, $\nabla f(x)$ is the image slice gradient, and $\nabla L(x)$ is the label image gradient; and
using a shortest path algorithm with a contour energy function of the form $$E(C) = \sum_{x \in C} \frac{1}{G^2(x) + \varepsilon},$$

where G is either the endocardial or epicardial gradient, and $\varepsilon$ is a small positive value to prevent a division by 0.

12. The method of claim 9, wherein finding best endocardium and epicardium contours for each other slice further comprises calculating $$E'(C_q) = \min\left\{E(C_p) + D^2(x), \frac{1}{\varepsilon}\right\},$$

wherein $E'(C_q)$ is the energy of the contour in a current slice, $E(C_p)$ is the energy of the contour propagated from a previous slice, $D^2(x)$ is a distance map of pixels x in said current slice with respect to the contour propagated from said previous slice, and the $$\frac{1}{\varepsilon}$$

term bounds the cost function.

13. A program storage device readable by a computer, tangibly embodying a program of instructions executable by the computer to perform the method steps for cardiac segmentation in magnetic resonance (MR) cine data, the method comprising the steps of:
   providing a time series of 3D cardiac MR images acquired at a plurality of phases over at least one cardiac cycle, wherein each 3D image comprises a plurality of 2D slices, wherein a heart and blood pool has been detected in each image;
   analyzing gray scales of each image in the time series of images to compute histograms of the blood pool, myocardium, and the whole series of images;
   calculating non-rigid registration deformation fields to register a selected image slice with corresponding slices in each phase of the time series of images;
   computing endocardium and epicardium gradients for one phase of the selected image slice;
   computing contours for the endocardium and epicardium from said gradients in said one phase of said selected image slice; and
   recovering the endocardium and epicardium contours in all phases of the selected image slice, including
      propagating the endocardium and epicardium contours to all other phases of the selected image slice using the non-rigid registration deformation fields;
      finding the endocardium and epicardium contours in each of the other phases of the selected image slice;
      finding a best contour for the selected image slice by finding a phase having a contour with a lowest energy, wherein the energy K(p) of a contour in a given phase p is $$K(p) = \sum_q E(C_q(C_p)),$$

wherein $C_p$ is the contour in phase p, $C_q$ is the contour in phase q, and E is the energy of the contour in phase q; and
      propagating said best contour to the other phases using the non-rigid registration deformation fields,
      wherein said recovered endocardium and epicardium contours segment the heart in said selected image slice.

14. The computer readable program storage device of claim 13, the method further comprising using image pixels in peaks of said histograms to seed a multiseeded fuzzy connected algorithm to group image pixels into homogenous regions for the heart, blood pool, and background to form a label image, wherein said heart, blood pool, and background are labeled.

15. The computer readable program storage device of claim 13, wherein calculating non-rigid registration deformation fields to register a selected image slice with corresponding slices in each phase of the time series of images comprises finding an inverse consistent deformation field $\Phi_{pq}: R^2 \mapsto R^2$ between two phases $f_p$ and $f_q$ of a given slice that minimizes an inverse consistent similarity metric $J_C^{ic} = J_{CC}(f_p, f_q, \Phi_{pq}) + J_{CC}(f_q, f_p, \Phi_{qp})$.

16. The computer readable program storage device of claim 15, wherein said similarity metric is defined as $$J_{CC}(f_p, f_q, \Phi_{pq}) = \sum_x \frac{\sum_N (f_p(x) - \overline{f}_p)(f_q(\Phi_{pq}(x)) - \overline{f}_q)}{\sqrt{\sum_N (f_p(x) - \overline{f}_p)^2 \sum_N (f_q(\Phi_{pq}(x)) - \overline{f}_q)^2}},$$

wherein $\overline{f}_p$ and $\overline{f}_q$ are the mean values in a neighborhood around pixel location x in both slice phases, and N is the number of elements in that neighborhood.

17. The computer readable program storage device of claim 15, wherein the similarity metric is minimized using variational calculus and solving a partial differential equation that descends a gradient of $J_{CC}$.

18. The computer readable program storage device of claim 14, wherein computing endocardium and epicardium gradients comprises:
   computing probability images $P_M$ and $P_B$ as responses from the myocardium and blood pool histograms;
   computing gradients of said probability images and of the selected image slice;
   analyzing said label image L to find upwards transitions from the myocardium to non-myocardium, and smoothing said transitions; and
   computing the gradients for the endocardium and epicardium according to $$G^{endo}(x) = \begin{cases} 0, & \text{if } \pi < \overrightarrow{\nabla P_M} < 2\pi \text{ or } 0 < \overrightarrow{\nabla P_B} < \pi \\ \frac{\nabla P_M(x) + 0.5 \nabla f(x) + \nabla L(x)}{2.5}, & \text{otherwise} \end{cases},$$

$$G^{epi}(x) = \begin{cases} 0, & \text{if } 0 < \overrightarrow{\nabla P_M} < \pi \\ \frac{0.5 \nabla P_M(x) + 0.5 \nabla P_B(x) + \nabla f(x)}{2}, & \text{otherwise} \end{cases},$$

wherein x is a pixel, $G^{endo}(x)$ is the endocardium gradient, $G^{epi}(x)$ is the epicardium contour, $\nabla P_M(x)$ is the myocardium gradient, $\nabla P_B(x)$ is the blood pool gradient, $\nabla f(x)$ is the image slice gradient, and $\nabla L(x)$ is the label image gradient.

19. The computer readable program storage device of claim 18, wherein computing contours for the endocardium and epicardium from said gradients comprises using a shortest path algorithm with a contour energy function of the form $$E(C) = \sum_{x \in C} \frac{1}{G^2(x) + \varepsilon},$$

where G is either the endocardial or epicardial gradient, and $\varepsilon$ is a small positive value to prevent a division by 0.

20. The computer readable program storage device of claim 13, the method further comprising:
propagating said best contour to other slices using the non-rigid registration deformation fields; and
finding a best contour for each other slice by calculating $$E'(C_q) = \min\left\{E(C_p) + D^2(x), \frac{1}{\varepsilon}\right\},$$

wherein $E'(C_q)$ is the energy of the contour in a current slice, $E(C_p)$ is the energy of the contour propagated from a previous slice, $D^2(x)$ is a distance map of pixels x in said current slice with respect to the contour propagated from said previous slice, and the $$\frac{1}{\varepsilon}$$

term bounds the cost function.

21. The computer readable program storage device of claim 20, wherein for a first slice to be segmented, finding a best contour comprises minimizing $$\left\{E(x) + \frac{D(x)}{\varepsilon \max_x D(x)}, \frac{1}{\varepsilon}\right\},$$

wherein $E(x)$ is the energy of a contour derived from the blood pool detection, $D(x)$ is the distance map of the contour that shows at every pixel the distance to the nearest contour point, and the $$\frac{1}{\varepsilon}$$

bounds the energy function.

* * * * *